United States Patent [19]

Bridgstock et al.

[11] Patent Number: 4,486,650

[45] Date of Patent: Dec. 4, 1984

[54] ELECTRO-FUSION FITTING AND CONTROL APPARATUS THEREFOR

[75] Inventors: Eric Bridgstock, Derbyshire; David M. A. Kenworthy; Brian Glaves, both of South Yorkshire; David A. Bilton, Derbyshire, all of England

[73] Assignees: Fusion Plastics Ltd., Chesterfield; Vectstar Limited, Sheffield, both of England

[21] Appl. No.: 424,905

[22] Filed: Sep. 27, 1982

[30] Foreign Application Priority Data

Sep. 30, 1981 [GB] United Kingdom ............... 8129529

[51] Int. Cl.³ ............................................. H05B 3/58
[52] U.S. Cl. .................................. 219/544; 156/380.1;
 219/535; 219/541; 285/21; 285/292
[58] Field of Search .............. 219/386, 494, 528, 534,
 219/535, 541, 544, 548, 552; 285/21, 292, 22,
 286, 369, 423; 156/380.1; 174/84 S; 264/272.11;
 330/5, 7, 8; 307/402, 424

[56] References Cited

U.S. PATENT DOCUMENTS 3,789,192  1/1974  Spindler .................... 219/544 X
4,253,011  2/1981  Hinz ......................... 219/544 X

FOREIGN PATENT DOCUMENTS 398957  3/1966  Switzerland .

Primary Examiner—Volodymyr Y. Mayewsky
Attorney, Agent, or Firm—Watson, Cole, Grindle & Watson

[57] ABSTRACT

An electro-fusion fitting for coupling thermoplastic pipes incorporates a heating coil (2) and has a resistor (6) with a value chosen in accordance with the power to be supplied to the coil connected between a main terminal (4) and an auxiliary terminal (5). Control apparatus is adapted to sense the resistance value and supply electric current to the coil for a predetermined time set automatically according to the resistance value.

12 Claims, 3 Drawing Figures

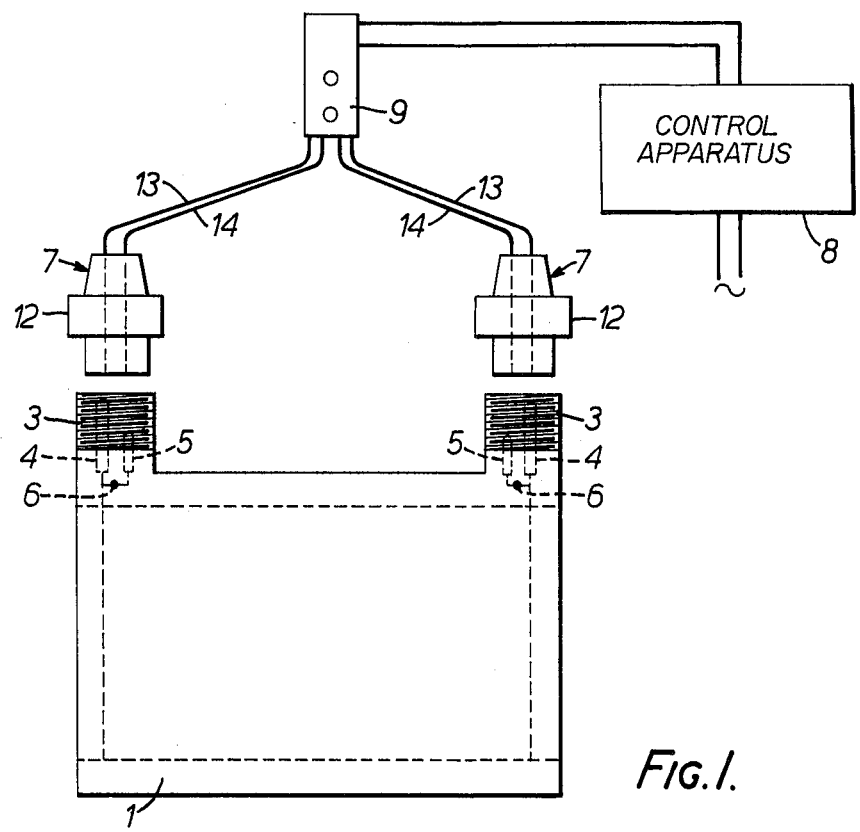
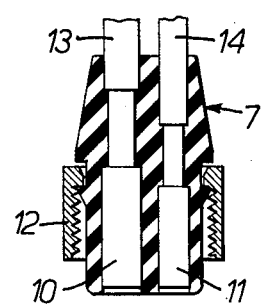
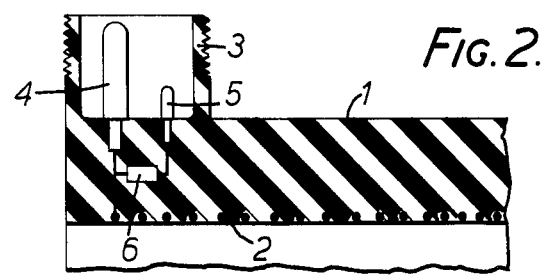

ELECTRO-FUSION FITTING AND CONTROL APPARATUS THEREFOR

This invention relates to electro-fusion fittings, i.e. a fitting comprising a body of thermoplastic material having an electrical resistance heating element disposed adjacent a surface of the body and to which an electric current may be supplied to fuse the material of the body to that of a member which is to be welded to the fitting, the ends of the heating element being connected to respective terminals for supplying electric current thereto. The invention is also concerned with apparatus for controlling the supply of electric power to such fittings to complete the welded joints.

Electro-fusion fittings are frequently used in the production of pipe joints between pipe lengths of thermoplastic material, such as polyethylene, as used in the gas industry, for example. A pipe jointing fitting usually comprises a sleeve or muff of thermoplastic resin embodying a coil of resistance heating wire adjacent its inner surface, the ends of the wire being connected to terminals for supplying the electric heating current from suitable control equipment. In use, the ends of the pipes to be connected are pushed into the sleeve, the necessary connections are made between the fitting and control equipment, and then a predetermined current is supplied for a controlled period to soften and fuse the material of the sleeve and pipes so that they become welded firmly together.

Generally the pipe joints obtained through use of electro-fusion fittings are very satisfactory, but the method has the disadvantage that it must be carried out by skilled, trained personnel if good results are to be ensured. The difficulty is that the weld strength achieved depends upon the correct current value being supplied for the correct amount of time, and these factors differ for fittings of different sizes and types.

An aim of the present invention is to overcome the above drawback of the prior art fittings, and an electro-fusion fitting in accordance with the invention is characterised in that the fitting includes auxiliary terminal contact means connected electrically to a device having a characteristic electrical parameter the value of which can be sensed electrically by suitable apparatus and is selected in accordance with the electric power with which the fitting should be supplied.

In a preferred fitting the device comprises a resistor and is connected between a terminal and an auxiliary terminal contact.

A fitting according to the invention has the advantage that, when used with appropriate control equipment, a satisfactory joint will be obtained even when performed by unskilled labour. The value of resistor or other component, can be identified by control apparatus which sets automatically the time for which the selected current will be supplied to the fitting. Obviously fittings of different sizes and types which have different power demands will be fitted with electrical components with different values to which the control apparatus will respond accordingly. With such a system the scope for human error is effectively minimised.

In a range of fittings of different sizes the period during which electric power should be supplied may range, for example, from about 10 seconds to about 400 seconds. For the same range of fittings the resistance value of the electric heating winding may vary only from about 0.5 ohms to about 5 ohms. Sensing the resistance value of the winding itself to determine the time for which power will be supplied to a particular fitting is not practical since the variations in resistance values between the windings of different fittings are not significant enough to allow the time to be set accurately. However by incorporating an identity resistor in the fitting in accordance with the invention and sensing the value of this resistor (or the combined resistance of the resistor and winding) the appropriate time periods can be accurately set since the resistance values may range for example from about 50 ohms or less to 7500 ohms or more.

A control apparatus for use in combination with the electro-fusion fitting of the invention comprises main and auxiliary contacts for connection respectively to said terminals and auxiliary terminal contact means of the fitting, power supply means for supplying electric current to said main contacts, switch means to control the supply of electric current to the main contacts, sensor means connected to said auxiliary contacts for sensing the value of said characteristic parameter of the device of the fitting, and generating an output signal in accordance therewith representing the set time for which electric current is to be supplied to the main contacts, control means connected to the sensor means for receiving a start signal therefrom and closing the switch means in response thereto and for opening said switch means when said set time has elapsed.

A better understanding of the invention will be had from the following detailed description, reference being made to the accompanying drawings in which:

FIG. 1 shows an electro-fusion fitting embodying the invention together with the control apparatus;

FIG. 2 is a longitudinal section through part of the fitting and a connector.

Figure 3:
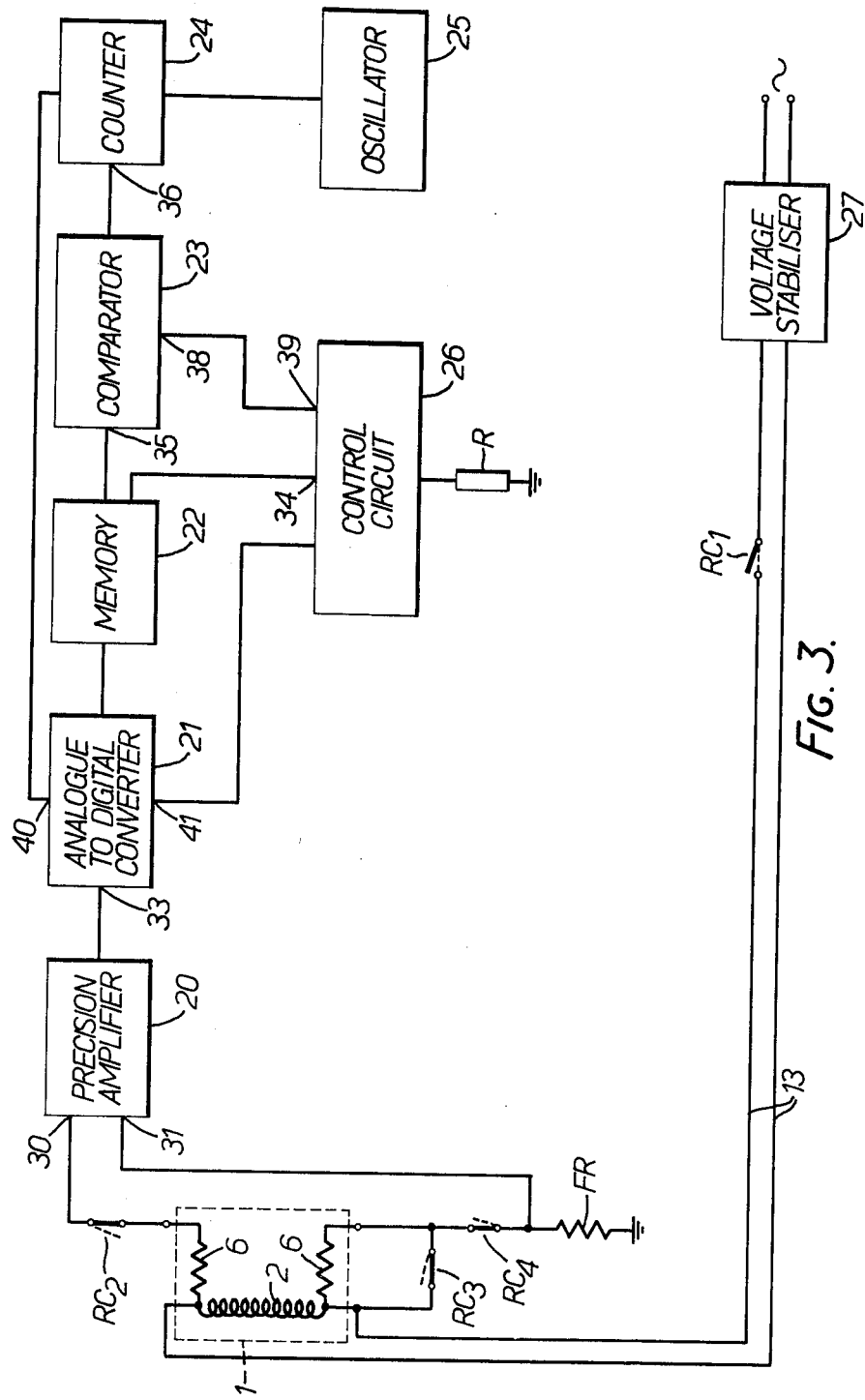
FIG. 3 illustrates schematically the circuit of the control apparatus and fitting.

The electro-fusion fitting 1 shown in the drawings is intended for joining lengths of plastic pipe and consists of a body of thermoplastic material in the form of a cylindrical sleeve having embedded therein, close to the inner surface, a coil of electrical resistance heating wire 2 (FIG. 2). The fitting may be conveniently manufactured by winding a wire coated with the thermoplastic material onto a mandrel and then injection moulding the sleeve body around the mandrel and coiled wire. Other methods of making the fitting, known per se, may also be used.

At each end the sleeve has an integral, laterally protruding tubular boss 3 which carries an external screw thread. Moulded in position within each boss is a pair of pin contacts, namely a main contact pin 4 which is connected directly to the adjacent end of the coiled resistance wire 2, and an auxiliary contact pin 5 which is shorter and of smaller diameter than the main contact pin 4 and is connected electrically to the contact pin 4 through a resistor 6. The resistor 6 is embedded in the sleeve wall of the fitting 1 and has a predetermined resistance value which is selected in accordance with the power which needs to be supplied to the particular fitting to obtain a satisfactory joint.

The control apparatus includes a pair of socket connectors 7 which are connected electrically to a control unit 8 via a hand controlled 9. Each of the connectors 7 consists of a cylindrical part dimensioned to fit with a boss 3 of the sleeve 1 and including a pair of socket contacts 10, 11 for receiving the respective contact pins 4, 5. An internally screw threaded collar 12 is rotatably mounted on the connector body for cooperation with the external thread on boss 3 to hold the connector 7 securely in engagement with the fitting 1. Electric cables 13, 14 connect from the connector contacts 10, 11 to the control unit 8. The hand controller 9 is provided to enable all the necessary operations to be carried out in the vicinity of the joint being completed, while allowing the control to be positioned at a remote location.

In FIG. 3 the control apparatus is shown in operative combination with the fitting 1, it being assumed that the necessary connections between the connectors 7 and the fitting 1 have been properly made. The apparatus includes a precision amplifier 20, an analogue to digital converter 21, a memory 22, a comparator 23, a counter 24, an oscillator 25, a control circuit 26, a voltage stabiliser 27, a relay R having a normally open contact set $RC_1$ and three normally closed contact sets $RC_2$, $RC_3$ and $RC_4$, and a resistor FR of predetermined fixed resistance.

The fixed resistor FR is connected in series with relay contact $RC_4$, relay contact $RC_3$, the heating coil 2, one coding resistor 6 and relay contact $RC_2$ between ground (0 v) and a stabilised d.c. voltage (e.g. $+10$ v) obtained as an output 30 from the precision amplifier 20. The amplifier has an input 31 connected to the common junction between the fixed resistor FR and the relay contact $RC_4$. The voltage received at the input 31 is that derived across the fixed resistor FR and will depend on the total resistance of the coil 2 and the identifying resistor 6, the coil 2 and resistors FR, 6 constituting a potential divider. In general the coil resistance will be low in comparison with that of the resistor 6, and the voltage signal received at the amplifier input 31 is representative of the time for which power is to be supplied to the heating coil. Connected across the coil 2 is the output of voltage stabiliser 27 which is adapted to produce a stabilised a.c. output e.g. 38 v at 50 amps. The output of the voltage stabiliser is supplied to the coil under control of the relay contact $RC_1$.

The amplifier 20 is a high precision amplifier of unity gain and its output is fed to the input 33 of an analogue to digital (A to D) converter 21 which provides, e.g. a 10 bit digital output which is fed to the memory 22. The memory is electrically programmable and stores information regarding the expected binary voltage input signals to be supplied thereto for a range of fittings including resistors 6 with different resistance values, as well as the correlation between the digital voltage signal and the time for which power should be supplied to the fitting 1. The memory checks that the binary input voltage signal from the A to D converter represents a valid code and, if it does emits a start signal to a first input 34 of the control circuit 26. The memory also produces a binary output time signal representing the duration of power supply to the coil 2 of the fitting 1 and this output is supplied to a first input 35 of the comparator 23. A second input 36 of the comparator 23 is connected to an output from the counter 24 which upon triggering counts pulses emitted e.g. at 1/10 second intervals by the oscillator 25. The counter counts in one second steps, for example up to 1000 seconds, and its output is compared directly by the comparator with the memory output. When the two inputs of the comparator coincide, indicating that the required time has elapsed a stop signal is emitted from an output 38 of the comparator 23 to a second input 39 of the control circuit 26.

The control circuit 26 controls the relay R. On receiving a start signal at its input 34 the relay R is energised to change over the contact sets $RC_1$–$RC_4$. Contacts $RC_1$, $RC_2$ and $RC_3$ open to disconnect the fitting from the amplifier 20, and $RC_1$ is closed so that power is supplied to the heater coil 2 from the voltage stabiliser 27. The stop signal received at input 39 of the control circuit causes the relay R to be de-energised and the contact sets $RC_1$–$RC_4$ revert to their initial conditions, contact $RC_1$ opening to interrupt the power supply to the coil 2.

As shown in FIG. 3 the A to D converter has two additional outputs 40, 41, the former being connected to the counter 24 and serving to trigger the counter to commence counting. The trigger signal for the counter could alternatively be derived from the amplifier 20 or the memory 22. The second output 41 is connected to the control circuit. A signal is emitted at this output if an unstable binary output is produced by the converter, and disables the equipment since it indicates a fault in the fitting 1, the amplifier 20 or the converter 21 itself.

The manner in which the above system is used and operated for coupling pipes will now be described. The correct size fitting 1 for the particular pipes to be joined is taken and the ends of the pipes are pushed into the opposite ends of the sleeve. The two connectors 7 are engaged with the respective terminal portions at the opposite ends of the sleeve and are secured in position by screwing the collars 12 down onto the bosses 3, thereby ensuring that the sockets contacts 10, 11 are correctly engaged with the pins 4, 5. The electrical connections will then be properly made as depicted in FIG. 3. Assuming that the control unit 8 is already connected to a suitable electric power supply, a start button on the hand controller 9 is then pressed to initiate the welding operation.

Pressing the start button applies the stabilised d.c. voltage across the potential driver consisting of identification resistor 6 and coil 2, and the fixed resistor FR. The amplifier 20 senses the voltage across FR and supplies an output to the A to D converter which converts the voltage signal into binary form and transmits it to the memory 22. At the same time the converter provides a trigger signal to the counter 24 which commences counting the pulses from the oscillator 25. The memory 22 checks the validity of the input signal and if satisfied that it corresponds to a recognised total resistance value for the coding resistor 6 and coil 2, within a certain tolerance, it emits a start signal to the control circuit 26.

It should be noted that the circuitry could be so arranged that the stabilised d.c. voltage is applied across the fixed resistor FR and one coding resistor 6 only so that the coil is not included in the potential divider circuit. However, it is preferred to include the heater element since it allows the coil to be checked automatically for faults before any power is supplied to it. For example, a short circuit or a break in the coil 2 will result in an output from the A to D converter which is not recognised as an acceptable input by the memory and no start signal will be emitted to the control circuit 26.

When the control circuit receives the start signal from the memory it energises the relay R to close the contact $RC_1$ and complete the circuit between the voltage stabiliser 27 and the heater coil.

The memory 22 provides a binary time signal to the comparator in accordance with the binary voltage input, and when this time signal is equal to that emitted by the counter, indicating that the necessary time has elapsed, a stop signal is emitted to the control circuit 26 thereby de-energising the relay R and opening contact RC₁ to interrupt the current supply to the coil 2.

The electric current supplied to the coiled resistance wire 2 raises the temperature of the thermoplastic material at the interface between the sleeve and pipes so that they soften and fuse together to form a permanent welded joint connecting the pipe ends. When the current supply is terminated after the set time, which may be indicated by a lamp on the hand controller 9, the connectors 7 are released from the fitting to leave the completed joint.

As the amount of power supplied to the fitting is determined automatically by the control unit and is not dependent upon the operator, the quality of the finished joint does not rely on the skill of the operator and satisfactory joints can be made by unskilled personnel.

It will be appreciated that the terminal portions of the fitting and the cooperating connectors are constructed so that incorrect connection is not possible. If the connectors 7 are not inserted properly and screwed down to bring into contact the pins 5 and sockets 11, the control unit will not supply any current to the resistance wire 2.

If a connector 7 should be disengaged from the fitting during the period when current is being fed to it, the contacts 5 and 11 will part first and the control unit could be arranged to respond and rapidly turn off the current flowing to the fitting before the contacts 4, 10 are separated. In this way any danger of arcing between the contacts 4, 11 may be precluded, making the apparatus safe to use even in an explosive atmosphere.

Because the control unit identifies the fitting automatically according to the resistance value of the resistors 6 embodied in it, the same control unit can be used with a large range of fittings of different sizes and types, provided of course that it is programmed to recognise and respond to the resistance values by means of which the various fittings are distinguished according to their individual power requirements.

It should be noted that only one of the two coding resistors is used, i.e. the upper one as seen in FIG. 3. However, it is preferred to provide one at each end of the coil so that the fitting is symmetrical and it is unimportant which way round the two connectors 7 are attached to the fitting. If a single resistor is used the plug connectors 7 and fitting sockets may be so adapted that each connector can be fitted to only one end of the fitting to ensure that the electrical connections are correctly made.

We claim:

1. An electro-fusion fitting adapted for use with electrical control means to control the electrical power supplied to the fitting for welded attachment to a member of thermoplastic material, comprising: a body of thermoplastic material having a surface for engagement with said member, an electrical heating element disposed in and adjacent to said surface of the body, terminals electrically connected to the heating element for supplying an electric current to said heating element to fuse the material of the body to said member to be welded to the fitting, a device supported by said body and having a predetermined fixed characteristic electrical parameter, said device generating an electrical signal representative of said predetermined fixed characteristic electrical parameter selected in accordance with the electric power to be supplied to said heating element of the fitting, and electrical contact means supported by the body for electrical connection to said electrical control means and said device being electrically connected to said contact means and said contact means including at least one auxiliary terminal contact additional to said terminals.

2. The improved electro-fusion fitting of claim 1, wherein each terminal connected to the heating element is connected to said auxiliary terminal contact means through a respective device, the devices each having the same value for said characteristic electrical parameter.

3. The improved electro-fusion fitting of claim 1, wherein said device is a single electrical component.

4. The improved electro-fusion fitting of claim 3, wherein said electrical component is a resistor.

5. The improved electro-fusion fitting of claim 1, wherein said characteristic electrical parameter is the ohmic resistance value of the device.

6. A plurality of electro-fusion fittings each as claimed in claim 1, wherein each fitting has a different electric power requirement and said device of each fitting has a different value for said characteristic electrical parameter.

7. The electro-fusion fitting according to claim 1 in combination with control apparatus therefor, the control apparatus including main and auxiliary contacts for connection respectively to said terminals and auxiliary terminal contact means of the fitting, power supply means for supplying electric current to said main contacts, switch means to control the supply of electric current to the main contacts, sensor means connected to said auxiliary contact for sensing the value of said characteristic parameter of the device of the fitting, and generating an output signal in accordance therewith representing the set time for which electric current is to be supplied to the main contacts, and control means connected to the sensor means for receiving a start signal therefrom and closing the switch means in response thereto and for opening said switch means when said set time has elapsed.

8. The combined fitting and control apparatus of claim 7, wherein the sensor means includes a programmed memory device for checking whether an input signal supplied thereto corresponds to one of a number of valid values, and in response to a valid input signal emitting said start signal and said sensor output signal.

9. The combined fitting and control apparatus according to claim 7, wherein said control means includes a comparator having a first input connected to receive said sensor output signal, a device for emitting a time dependent output signal, the comparator having a second input for receiving the time dependent signal and emitting a stop signal when said time dependent signal coincides with the sensor output signal, and a control device connected to receive said start and stop signals and to close and open the switch means in response thereto.

10. The combined fitting and control apparatus of claim 7, wherein the said device of the fitting has a characteristic ohmic resistance value, the sensor means includes a resistor element of predetermined resistance connected in series with the device when the main and auxiliary contacts are connected to the terminals and auxiliary terminal contact means of the fitting, the sensor means being arranged to apply a predetermined d.c.

voltage across said series connected device and resistor and to sense the voltage at a point between said device and said resistor.

11. The combined fitting and control apparatus according to claim 10, wherein the heating element and the device are connected electrically in series between said point at which the voltage is sensed and the source of said d.c. voltage.

12. The improved electro-fusion fitting of claim 1, wherein said device is connected between one of said terminals connected to said heating element and said auxiliary terminal contact means.

* * * * *